July 21, 1964 W. L. McGRATH ET AL 3,142,013

MOTOR PROTECTIVE SYSTEM FOR AIR CONDITIONING UNIT

Original Filed March 4, 1960 2 Sheets-Sheet 1

INVENTORS.
WILLIAM L. MC GRATH.
ROBERT F. RANDOLPH.
BY

ATTORNEY.

United States Patent Office 3,142,013
Patented July 21, 1964

3,142,013
MOTOR PROTECTIVE SYSTEM FOR AIR
CONDITIONING UNIT
William L. McGrath, Syracuse, and Robert F. Randolph, Manlius, N.Y., assignors to Carrier Corporation, Syracuse, N.Y., a corporation of Delaware
Original application Mar. 4, 1960, Ser. No. 12,782. Divided and this application Mar. 5, 1962, Ser. No. 177,637
2 Claims. (Cl. 318—471)

This application is a division of our copending application Serial No. 12,782, filed March 4, 1960, entitled "Air Conditionoing Unit" and relates to an air conditioning unit and particularly to a new protective device for compressors used in the refrigerating systems of such unit.

The general object of this invention is to provide an air conditioning unit having a refrigerating system including a compressor motor protection system wherein whenever the compressor motor stops for any reason, it will not be permitted to restart until a predetermined period of time has elapsed subsequent to stopping.

In the conventional air conditioning unit refrigerating system, when the electrical circuit to the compressor motor is opened for any reason, as for example, by opening a safety switch responsive to an abnormal load condition in the refrigerating system, the circuit is completed again immediately by closing the safety switch. The refrigerant pressure in the system may not have had sufficient time to equalize so that when the circuit is closed, the split-phase motor commonly employed to drive the compressor, having a low starting torque, will be unable to start the compressor. One type of overload mechanism provided with the motor would open and prevent the surge current from running through the motor for too long a period of time if the motor should fail to start. It would be necessary, however, to manually reset the overload mechanism before the motor could again be energized. Automatic overload protection is desirable when the equipment is located in an unaccessible area, however, automatic reset overload mechanisms usually permit rapid cycling which result in overheating and damage to the insulation on the motor windings.

It has been found that the thermal-actuated control switch or thermostat responsive to room temperature commonly used with an air conditioning unit is sometimes closed temporarily by the vibrations generated by slamming a door or walking heavily near the thermostat. This quick opening and closing of the circuit results in rapid cycling of the compressor motor with a high initial current and with higher transient current that can be very damaging to the compressor motor.

On repeated power interruptions, the compressor of the conventional system could cycle rapidly and the compressor motor could be thrown across the line with reduced voltage presenting a possibility of damage.

Further, after power failure, all the electrical elements of a distribution system would tend to resume operation at once. The condenser and evaporator fan motors and the compressor motor of the conventional air conditioner would go on together with the other electrical elements adding to the overloading of the circuit.

This invention relates to an air conditioning unit having in combination a casing, a refrigeration system including a compressor, a condenser, expansion means and an evaporator placed in the system in such order, a partition dividing the casing into a condenser compartment and an evaporator compartment, a motor operatively connected to said compressor, a condenser fan for supplying air over the condenser, an evaporator fan for supplying air over the evaporator, motor means for actuating said fans, a circuit adapted to be connected to a source of electric current, control means for interrupting the circuit in response to an abnormal load condition, and timing means in the circuit energized in response to interruption of the circuit by the control means to hold the circuit open for a predetermined length of time, whereby, whenever the control means interrupts the circuit, the motor is stopped and restart is not permitted until after the predetermined length of time.

This invention further relates to a method of operating an air conditioning unit having a refrigeration system including a compressor comprising the steps of energizing an electric motor in response to a first load condition to actuate the compressor, deenergizing the electric motor in response to a second load condition to stop the compressor, and actuating a time control in response to any deenergization of the electric motor to provide a predetermined time delay before the electric motor can again be energized.

The specific details of the invention and their mode of functioning will be made most manifest and particularly pointed out in conjunction with the accompanying drawings, wherein.

Referring now more particularly to the drawings, like numerals in the various figures will be taken to designate like parts.

Figure 1:
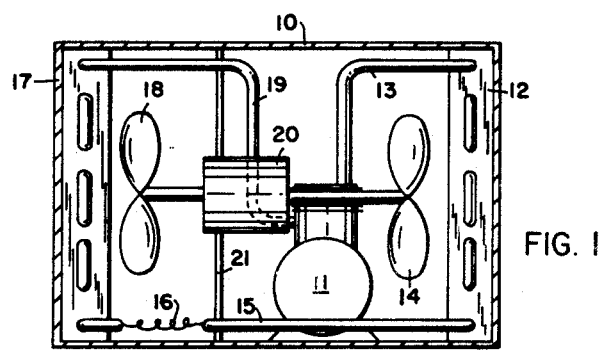
FIGURE 1 is a schematic illustration of a type of air conditioning unit to which the present invention applies.

One embodiment of the invention will be described as it pertains to an air conditioning unit of the room cooler type which is schematically illustrated in FIGURE 1. As is well known to those skilled in the art, a housing or casing 10 supports the components of the room cooler within a window having the lower sash in the raised or upper position. The casing 10 is usually positioned within a cradle secured to the window sill. A motor-compressor unit 11, which may be hermetically enclosed, forwards high pressure vaporous refrigerant to the condenser 12 through line 13. The vaporous refrigerant is converted to the liquid phase in the condenser as air at ambient temperatures is circulated over the condenser by fan 14. From the condenser, the liquid refrigerant flows through line 15 to an expansion means shown in the form of a capillary tube 16. It will be obvious that other expansion means, such as an expansion valve, may be used in place of the capillary tube. The liquid refrigerant flows from the capillary tube 16 to the evaporator 17 where a change in phase occurs as air at room temperature is circulated over the evaporator by fan 18. Electric motor 20 drives the fans 14 and 18 although separate motors may be employed if desired.

The liquid refrigerant in the evaporator is evaporated by its heat exchange relation with the warm air directed over the evaporator by fan 18, the vapor returning to compressor 11 through suction line 19 while the cooled air is directed through grilles formed in casing 10 into the room to be treated.

A partition 21 in the casing divides the refrigeration system in such a manner that the compressor and condenser is located in that part of the casing positioned out-side the window and the evaporator in that part of the casing inside the window.

Figure 2:
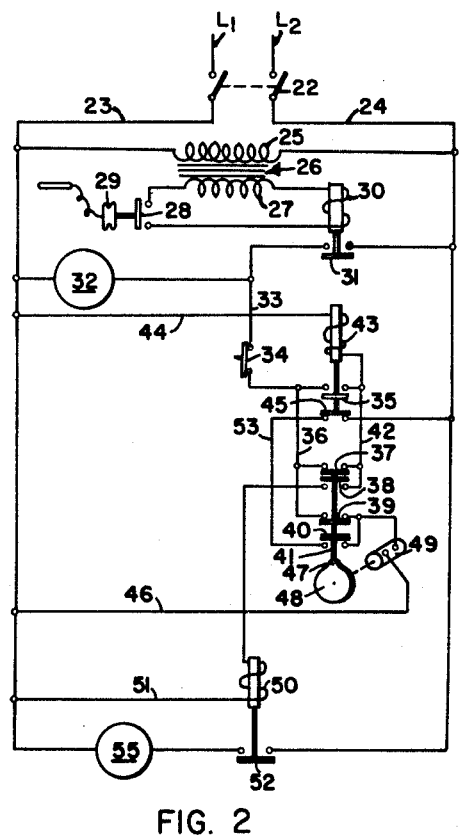
FIGURE 2 is a schematic wiring diagram of a preferred form of air conditioning unit compressor motor protection system.

A preferred form of compressor motor protection system is shown in FIGURE 2. A suitable source of current (not shown) is adaped to supply current via lines $L_1$ and $L_2$ to motor 55, which drives the compressor. The use of a permanent split capacitor motor is preferred, although a split-phase or capacitor type motor can be employed. It will be, of course, understood that the system can operate on three-phase current if it is suitably modified. A suitable manual switch 22, is provided to selectively control the flow of current to lines 23 and 24. The primary winding 25 of the transformer 26 is coupled across the lines 23 and 24, and selectively induces a voltage in the secondary winding 27 when the secondary circuit is completed. In this respect, it is to be noted that the secondary circuit is completed when the thermal-actuated switch 28 connected to thermostat 29 closes in response to a predetermined temperature condition in the room to be air conditioned.

Closure of the thermal-actuated switch 28 energizes the relay coil 30 and closes the contact 31, completing a circuit through line $L_2$, switch 22, line 24, contact 31, fan motor 32, line 23 and line $L_1$ which permits the fan motor to operate independently of the operation of the compressor motor, as more fully explained hereafter. Switch 34 in line 33 may be a high pressure cutout switch suitably attached to the compressor or any other part of the high pressure side of the refrigeration system which will open the circuit if the compressor head pressure exceeds a predetermined maximum or the switch 34 may be a high temperature cutout switch such as a thermostat switch for the compressor motor which will open the circuit if the temperature of the compressor motor exceeds a predetermined maximum. Any desirable safety switches, as for example, a low suction pressure switch, a low oil pressure switch, or an overload switch may be placed in the circuit in series with the switch 34, if desired.

The holding relay includes a winding or coil 43, a normally open contact 35, and a normally closed contact 45. The timing means includes timing motor 49; cam 48 operatively connected to the motor shaft, the cam 48 having lug portion 47 thereon; and a plurality of contact means interconnected by actuating arm 41, said actuating arm 41 being actuated by rotation of cam 48. The contact means include normally closed contacts 37 and 39 and normally open contacts 38 and 40. A motor controller means or starting relay includes relay winding or coil 50 and normally open contact 52.

When contact 31 is closed, current flows through switch 34 via line 33. Contact 35 is normally open, therefore, current flows through line 36, normally closed contact 37, line 42, relay coil 43, line 44, line 23 and line $L_1$, energizing the relay coil 43, closing contact 35 and opening contact 45. A circuit is also completed through line 36, contact 39, timing motor 49, line 46, and line 23 energizing the timing motor. The lug 47 on cam 48 is moved from the actuating arm 41 in approximately 10° to 15° of rotation or in approximately ten seconds to open contacts 37 and 39 and to close contacts 38 and 40.

A circuit is then completed through line 24, contact 31, line 33, switch 34, switch 35, line 42, contact 38, relay coil 50, line 51 and line 23, energizing relay coil 50 and closing normally open contact 52. Current will then flow from line $L_2$ through line 24, contact 52, motor 55, line 23, and line $L_1$ to actuate compressor motor 55.

If the thermal-actuated switch 28 were opened, the coil 30 would be deenergized and contact 31 would open. The fan motor 32 would be deenergized. Relay coil 50 would be deenergized, opening contact 52 and stopping the compressor motor. Relay coil 43 would be deenergized and contact 35 would open and contact 45 would close. The closing of contact 45 would complete a circuit from line $L_2$ via line 24, contact 45, line 53, contact 40, timing motor 49, line 46, line 23 and line $L_1$, to energize timing motor 49 and begin the timing cycle, preferably, about four minutes in duration.

After about 350° of rotation, the lug 47 on cam 48 moves the actuating arm 41 upward to close contacts 37 and 39 and open contacts 38 and 40. Since contact 31 is open, the timing motor will be deenergized.

When thermal-actuated switch 28 is closed in response to a temperature condition in the room to be treated, the circuit is again ready to be energized. If the switch 28 had been closed during the predetermined timing cycle of perhaps four to five minutes, the timing motor would be energized and would immediately proceed into the start portion of the cycle. The prodetermined time delay permits pressure equalization in the compressor and enables the permanent split capacitor motor which has a low starting torque, to start the compressor in an unloaded condition.

Closing of switch 28 energizes the coil 30, closing contact 31, and starting the fan motor 32. Relay coil 43 would be energized closing contact 35 and opening contact 45. The timing motor 49 is energized via line 24, contact 31, line 33, line 36, contact 39, line 46 and line 23. The cam 48 rotates until the flat portion on lug 47 has moved clear of the lower part of actuating arm 41, then contacts 37 and 39 open and contacts 38 and 40 close deenergizing the timing motor. This timing interval is on the order of ten to fifteen seconds. The circuit is complete to relay coil 50, closing the contact 52 and energizing the compressor motor 55. It is seen that the start of the compressor motor is delayed ten to fifteen seconds after the start of fan motor 32. This delay permits the condenser fan to come up to full speed before starting the compressor motor and reduces the initial surge on the power lines that would result if both the fan motor and compressor motor started simultaneously. Further, if the condenser unit were located outdoors in the hot sun for example, starting of the fan motor before the compressor motor would permit the fan to circulate air over the condenser coil and reduce the temperature of the fluid therein so that at startup of the compressor the head pressure buildup would not be so great as to force the compressor high pressure cutout valve to open, in turn opening the high pressure switch to open the circuit.

If the switch 34 were opened while the thermal-actuated switch 28 were closed, coil 50 would be deenergized and motor 55 would be stopped as described above and the predetermined timing cycle of from four to five minutes would begin. Contact 31 would remain closed and the fan would remain operative. When the switch 34 again closes, the start portion of the cycle would begin as related above.

In conventional control arrangements, rapid opening and closing of the thermal-actuated switch would cause quick stopping and starting of the compressor motor and could result in an inrush of high transient currents that could damage the compressor motor. By virtue of the short delay of about ten to fifteen seconds between the closing of the thermal-actuated switch 28 and contact 31 and the starting of the compressor motor, firm engagement of the contact of the thermal-actuated switch is assured and the inrush of high transient currents is eliminated.

Thus our preferred compressor motor protection system prevents damage to the motor due to thermostat "jiggling" or due to short cycling of the safety switch responsive to an abnormal load and eliminates the necessity for manual reset thermal overload mechanism by providing a safe time interval after which the overload mechanism can be automatically reset.

Figure 3:
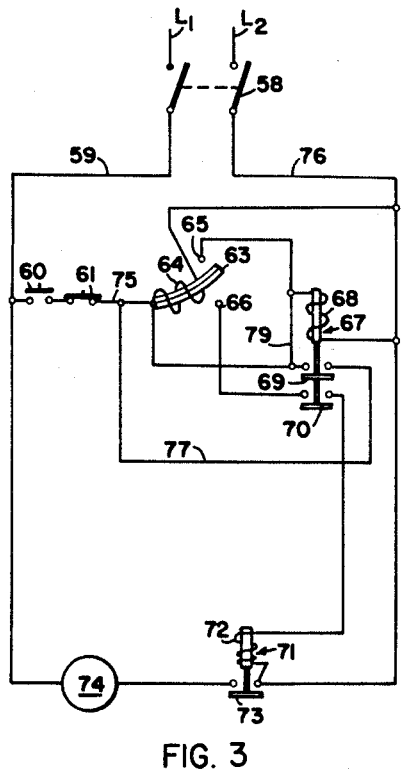
FIGURE 3 is a schematic wiring diagram illustrating a modified form of compressor motor protection system.

A modification of our invention is illustrated in FIGURE 3. Current is supplied via lines $L_1$ and $L_2$ to the motor 74 which drives the compressor. Manual switch 58 selectively controls the flow of current from $L_1$ and $L_2$ to lines 59 and 76.

The motor controller means or starting relay includes coil or winding 72 and normally open contact 73.

The control means includes thermal-actuated switch or thermostat 60 responsive to a predetermined temperature condition in the area to be air conditioned and safety switch 61. The safety switch may be a high pressure cutout switch. Other switches can be used as previously explained.

The timing means shown in FIGURE 3 comprises a bimetal 63, contacts 65 and 66, heater 64 and relay 67 having a winding 68 and normaly open contacts 69 and 70. When cool, the bimetal engages contact 65 and when heated by heater 64, the bimetal warps downwardly and engages contact 66.

A cycle of operation will be briefly described. Switch 58 is normally closed as is safety switch 61. At startup, bimetal 63 is cool and engages contact 65. When thermostat 60 is closed in response to a predetermined condition in the room to be air conditioned, a circuit is completed via line $L_1$, line 59, thermostat 60, switch 61, line 75, bimetal 63, contact 65, relay winding 68, line 76 and line $L_2$. Upon energization of winding 68, contacts 69 and 70 are closed. The closing of contact 69 completes a holding circuit through line 59, thermostat 60, switch 61, line 75, line 77, contact 69, line 79, winding 68 and line 76 to maintain winding 68 in an energized condition. Simultaneously, a circuit is completed through heater 64, causing the heater to be energized. The bimetal 63 is so constructed that after a predetermined period of time, the bimetal 63 warps downwardly into engagement with contact 66.

When bimetal 63 engages contact 66, a circuit is completed via line $L_1$, line 59, thermostat 60, switch 61, line 75, bimetal 63, contact 66, contact 70, motor controller 71, line 76, and line $L_2$. The motor controller winding 72 is energized and the contact 73 is closed. A circuit is thus completed from line $L_1$, line 59 through motor 74, contact 73, line 76 line $L_2$, energizing the motor 74.

If the thermostat 60 or safety switch 61 were opened, the holding circuit to the relay winding 68 would be broken and relay contacts 69 and 70 would open. The opening of contact 69 would break the heater energization circuit, permitting bimetal 63 to cool and warp upwardly. The opening of contact 70 would interrupt the circuit through winding 72. Upon deenergization of winding 72, contact 73 would be opened, deenergizing motor 74. Even if the open switch were immediately reclosed, the motor 74 could not be energized. The bimetal 63 must cool and reengage contact 65 before the predetermined period can begin. Therefore, whenever the control means interrupts the circuit, motor 74 is stopped and restart thereof is not permitted until after the predetermined time of from four to five minutes.

Figure 4:
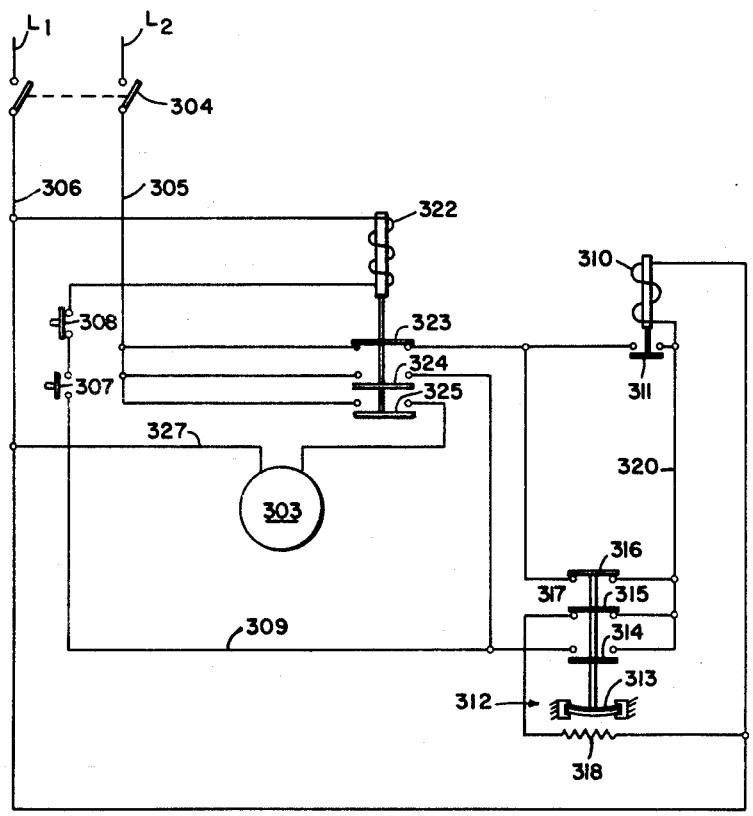
FIGURE 4 is a schematic wiring diagram of a further modification of the present invention.

In FIGURE 4, there is shown a schematic wiring diagram of a modified compressor motor protection system incorporating therein a thermal timing means.

The motor controller means or starting relay comprises a winding 322, normally closed contact 323 and two normally open contacts 324 and 325.

A control means includes a thermal-actuated switch 307 and a normally closed safety switch 308.

The holding relay provided includes winding 310 and normally open contact 311.

Time delay means 312 includes a bimetal 313, heater 318, and contacts 314, 315, and 316 actuated by means of arm 317 connected to said bimetal. The bimetal 313 is warped upwardly by heater 318 and warped downwardly as it cools.

To start the motor 303, manual switch 304 is closed to connect lines 305 and 306 to the supply lines $L_1$ and $L_2$ which are adapted to be connected to a source of current. Current flows through line 305, normally closed contact 323, normally closed contact 316, winding 310 and line 306, energizing winding 310 and closing contact 311. With the closing of contact 311, current flows through said contact and can bypass contact 316. Current flows via line 320, contact 315, and heater 318 to energize the heater and warp the bimetal upwardly. A rise in temperature to, for example, 220° will simultaneously open contact 315 and close contact 314. These contacts will close and open respectively on a drop in temperature to approximately 210°. Although not essential, the bimetal may be ambient compensated by a second bimetal working in opposition to bimetal 313 or the contact may be actuated through a friction clutch so that they respond to a difference in temperature rather than to specific temperatures. As the bimetal heats, contact 316 opens and after an interval of time, on the order of four to five minutes, contact 315 opens and contact 314 simultaneously closes. This action stops the heating of the bimetal and as it cools and warps downwardly, contact 315 closes.

When contact 314 closes, a circuit is completed via line 306, winding 322, switch 308, switch 307, line 309, contact 314, line 320, relay contact 311, contact 323 and line 305, energizing the winding 322. Contact 323 is opened and contacts 324, and 325 are simultaneously closed. The closing of contact 324 completes a holding circuit via $L_2$, line 305, contact 324, line 309, switch 307, switch 308, winding 322, line 306 and $L_1$, thus maintaining winding 322 in an energized condition. A circuit is completed via line 305, contact 325, line 328, motor 303, line 327 and line 306 energizing the compressor motor 303.

If during normal operation either switch 307 or 308 were opened, the winding 322 would be deenergized, closing contact 323 and opening contacts 324 and 325. Though contact 323 is closed, until the bimetal has cooled sufficiently to close contact 316, it will be impossible to restart. The closing of contact 316 will permit energizing winding 310 and a predetermined interval will elapse before contact 314 closes permitting restart of the compressor motor.

In the event of power failure, the same sequence results and a predetermined delay of four or five minutes duration will be occasioned before the compressor motor restarts.

We have provided a novel compressor motor protection means to provide an automatic delay in restarting subsequent to any deenergization of the compressor motor. A compressor motor is protected against damage from abnormal conditions in the electrical power distribution system and is also protected against damage from abnormal conditions in the refrigerating system. Safe automatic reset overload protection can be used in place of manual reset overload protection. The novel compressor motor protection means can be employed in applications other than in air conditioning units as for example, in refrigerating systems in general and in condensing units.

While we have described a preferred embodiment of the invention, it will be understood that the invention is not limited thereto, since it may be otherwise embodied within the scope of the following claims:

We claim:
1. A control circuit for a refrigerant compressor comprising a supply circuit for a motor; a controller having a switch for connecting said motor to said supply circuit, said controller having an energizing winding; switch means for making and breaking the circuit; and timing means comprising a bimetal, a bimetal heater, a first contact and a second contact adapted to be engaged by said bimetal, and holding means having a first switch and a second switch, said holding means having an energizing winding; a first circuit connecting said switch means, bimetal, first contact, and holding means energizing winding in series with said supply circuit, a second circuit connecting said switch means, said first switch, and said heater in series with said supply circuit, a third circuit connecting said switch means, said second contact, said second switch, and said controller energizing winding in series with said supply circuit; a fourth circuit connecting said motor and said controller switch in series with said supply circuit; and a line connected to said first circuit between said first contact and said holding means energizing winding and to said second circuit between said first switch and said heater.

2. A control circuit for a refrigerant compressor comprising an electric motor for actuating the compressor; a supply circuit for energizing the electric motor, a motor controller having a first normally open switch connecting said supply circuit to said motor, said controller having an energizing winding and second and third normally open contacts; control means including a normally closed switch; thermal timer means including a first normally closed contact, a second normally closed contact, a third normally open contact and a bimetal constructed and arranged to actuate the contacts; a holding relay including an energizing winding and a normally open contact; a first electrical circuit connecting the controller winding, control means, and second controller contact in series with the supply circuit; a second electrical circuit connecting the third controller contact and electric motor in series with the supply circuit; a third electrical circuit connecting the first controller contact, holding relay contact, and holding relay winding in series with the supply circuit, said first timer means contact connected across the holding relay contact, said second timer means contact connected in series with the bimetal across the holding relay winding, said third timer means contact connected to the first electrical circuit between the control means and the second controller contact and to the third controller circuit between the holding relay contact and holding relay winding.

References Cited in the file of this patent
UNITED STATES PATENTS
2,276,369     Buchanan _____ Mar. 18, 1942